United States Patent
Matsubayashi (10) Patent No.: US 10,836,926 B2
(45) Date of Patent: Nov. 17, 2020

(54) METHOD FOR PRODUCING ANTISTATIC MOLDED ARTICLE

(71) Applicant: Shin-Etsu Polymer Co., Ltd., Tokyo (JP)

(72) Inventor: Sou Matsubayashi, Saitama (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 107 days.

(21) Appl. No.: 15/244,899

(22) Filed: Aug. 23, 2016

(65) Prior Publication Data

US 2017/0058167 A1 Mar. 2, 2017

(30) Foreign Application Priority Data

Aug. 26, 2015 (JP) .................. 2015-166911

(51) Int. Cl.
| | | |
|---|---|---|
| C09D 165/00 | (2006.01) | |
| C09D 5/24 | (2006.01) | |
| C08L 65/00 | (2006.01) | |
| C09D 167/00 | (2006.01) | |
| C08J 7/04 | (2020.01) | |
| H01B 1/12 | (2006.01) | |

(52) U.S. Cl.
CPC .......... *C09D 165/00* (2013.01); *C08J 7/0427* (2020.01); *C08L 65/00* (2013.01); *C09D 5/24* (2013.01); *C09D 167/00* (2013.01); *C08J 2325/06* (2013.01); *C08J 2425/18* (2013.01); *C08J 2465/00* (2013.01); *H01B 1/127* (2013.01)

(58) Field of Classification Search
CPC ....................................................... C09K 3/16
See application file for complete search history.

(56) References Cited

U.S. PATENT DOCUMENTS

| | | | | |
|---|---|---|---|---|
| 2004/0091668 A1* | 5/2004 | Weder | ................... | B32B 3/30 428/141 |
| 2004/0241352 A1* | 12/2004 | Shih | ................... | B41M 5/5272 428/32.38 |
| 2005/0230666 A1* | 10/2005 | Otsuka | ................... | C09D 7/68 252/500 |
| 2007/0272589 A1* | 11/2007 | Suh | ................... | H01B 1/124 206/719 |
| 2012/0201995 A1* | 8/2012 | Melle | ................... | B05C 3/005 428/68 |
| 2012/0202072 A1* | 8/2012 | Asai | ................... | C08G 61/126 428/419 |
| 2014/0098467 A1* | 4/2014 | Sugawara | ................... | C08K 5/42 361/525 |
| 2014/0340811 A1* | 11/2014 | Pschenitzka | ................... | H05F 1/02 361/220 |
| 2016/0278191 A1* | 9/2016 | Kato | ................... | C09D 129/04 |

FOREIGN PATENT DOCUMENTS

| | | | |
|---|---|---|---|
| CN | 103694886 A | | 4/2014 |
| EP | 2949706 | * | 12/2015 |
| JP | 2000-079662 A | | 3/2000 |
| JP | 2008307441 | | 12/2008 |
| JP | 2009009125 | | 1/2009 |
| JP | 2010024457 | | 2/2010 |
| JP | 2010077294 A | | 4/2010 |
| JP | 2011195765 A | | 10/2011 |
| JP | 2012240235 | | 12/2012 |
| JP | 2015131890 A | | 7/2015 |
| JP | 2015131911 | | 7/2015 |
| WO | WO2014115807 | * | 7/2014 |
| WO | 2014125827 | | 8/2014 |
| WO | 2015/108001 A1 | | 7/2015 |

OTHER PUBLICATIONS

Taiwanese Office Action for Taiwan patent application No. 105126734 dated Apr. 5, 2017.
Office Action from the Korean Intellectual Property Office for Korean application No. 10-2016-0105986 dated Jul. 14, 2017.

* cited by examiner

*Primary Examiner* — Austin Murata
(74) *Attorney, Agent, or Firm* — Lando & Anastasi, LLP (57) ABSTRACT

A method for producing an antistatic molded article according to the present invention includes: a conductive film preparation step to obtain a conductive film by coating, and drying, a conductive polymer dispersion liquid containing a conductive composite that contains a π-conjugated conductive polymer and a polyanion, a polyvinyl alcohol, a binder component, and a dispersion medium for dispersing the conductive composite on at least one surface of a film substrate; and a molding step for subjecting the conductive film to molding.

17 Claims, 1 Drawing Sheet

METHOD FOR PRODUCING ANTISTATIC MOLDED ARTICLE

CROSS-REFERENCE TO RELATED APPLICATIONS

This application claims priority to Japanese Patent Application No. 2015-166911, filed Aug. 26, 2015, titled, METHOD FOR PRODUCING ANTISTATIC MOLDED ARTICLE, which patent application is hereby incorporated herein by reference in its entirety for all purposes.

TECHNICAL FIELD

The present invention relates to a method for producing an antistatic molded article containing a π-conjugated conductive polymer.

Priority is claimed on Japanese Patent Application No. 2015-166911, filed Aug. 26, 2015, the content of which is incorporated herein by reference.

BACKGROUND ART

In a molded article such as a tray for accommodating electronic components, in order to prevent failure of the electronic components due to static electricity, antistatic properties are provided in some cases.

As a method for producing a molded article for accommodating electronic components which is imparted with antistatic properties, for example, a method has been known in which a conductive film is produced by applying an aqueous dispersion liquid containing a π-conjugated conductive polymer on the surface of a film substrate to form a conductive layer, and the conductive film is subjected to vacuum molding so as to be in close contact with a mold having a convex portion or a concave portion (for example, see Patent Document 1).

PRIOR ART LITERATURE

Patent Document

[Patent Document 1] Japanese Unexamined Patent Application, First Publication No. 2000-79662

SUMMARY OF THE INVENTION

Problems to be Solved by the Invention

However, in the method for producing an antistatic molded article described in Patent Document 1 using the π-conjugated conductive polymer, the antistatic properties of the resulting antistatic molded article are sometimes unsatisfactory.

Accordingly, an object of the present invention is to provide a method for producing an antistatic molded article that is capable of easily producing a molded body having excellent antistatic in spite of using a π-conjugated conductive polymer.

Means for Solving the Problem

Although high stretchability is required for the film to be molded in the molding process, because the stretchability is lowered when the film contains a π-conjugated conductive polymer, there have been cases where the conductive layer is not stretched sufficiently at the time of molding, resulting in formation of cracks or the like to make the conductive layer uneven after molding. Therefore, the electrical conductivity of the conductive layer is decreased, and the antistatic properties of the molded body are lowered.

Accordingly, the inventors of the present invention have examined the method to improve the stretchability of the conductive layer containing a π-conjugated conductive polymer, and invented the following method for producing an antistatic molded article.

The present invention includes the following aspects.

[1] A method for producing an antistatic molded article, the method including: a conductive film preparation step to obtain a conductive film by coating, and drying, a conductive polymer dispersion liquid containing a conductive composite that contains a π-conjugated conductive polymer and a polyanion, a polyvinyl alcohol, a binder component, and a dispersion medium for dispersing the aforementioned conductive composite on at least one surface of a film substrate; and a molding step for subjecting the aforementioned conductive film to molding.

[2] The method for producing an antistatic molded article according to [1], wherein the aforementioned binder component contains a polyester resin having an alkali metal salt of an acid group and a glycidyl group-containing acrylic resin.

[3] The method for producing an antistatic molded article according to [2], wherein the aforementioned polyester resin is a polycondensate of a dicarboxylic acid component and a diglycol component; the aforementioned dicarboxylic acid component contains a dicarboxylic acid having a sulfonic acid alkali metal salt-type substituent, and the aforementioned diglycol component contains diethylene glycol.

[4] The method for producing an antistatic molded article according to any one of [1] to [3], wherein the aforementioned film substrate is continuously produced by extrusion molding while continuously coating the conductive polymer dispersion liquid to the film substrate, during coating in the aforementioned conductive film preparation step.

[5] The method for producing an antistatic molded article according to any one of [1] to [4], wherein the aforementioned conductive polymer dispersion liquid is simultaneously coated on both surfaces of the aforementioned film substrate, during coating in the aforementioned conductive film preparation step.

[6] The method for producing an antistatic molded article according to any one of [1] to [4], wherein after coating the aforementioned conductive polymer dispersion liquid on one surface of the aforementioned film substrate, the aforementioned conductive polymer dispersion liquid is coated on the other surface of the aforementioned film substrate without winding up, during coating in the aforementioned conductive film preparation step.

[7] The method for producing an antistatic molded article according to any one of [1] to [6], wherein the aforementioned film substrate is constituted of any one of an amorphous polyethylene terephthalate film, a polystyrene film, a rubber-reinforced polystyrene film, and a polypropylene film.

[8] The method for producing an antistatic molded article according to any one of [1] to [7], wherein the aforementioned dispersion medium contains water, and a content of water in the aforementioned dispersion medium is 80% by mass or more, relative to the total mass of the dispersion medium.

[9] The method for producing an antistatic molded article according to any one of [1] to [8], wherein the aforementioned π-conjugated conductive polymer is poly(3,4-ethylene dioxythiophene).

[10] The method for producing an antistatic molded article according to any one of [1] to [9], wherein the aforementioned polyanion is a polystyrene sulfonic acid.

[11] The method for producing an antistatic molded article according to any one of [1] to [10], wherein the aforementioned conductive polymer dispersion liquid further contains a conductivity enhancing agent.

[12] The method for producing an antistatic molded article according to [11], wherein the conductivity enhancing agent is propylene glycol.

Effects of the Invention

According to the method for producing an antistatic molded article of the present invention, a molded body having excellent antistatic properties can be easily produced in spite of using a π-conjugated conductive polymer.

DETAILED DESCRIPTION OF THE INVENTION

<Antistatic Molded Article>

An antistatic molded article obtained by the method for producing an antistatic molded article according to one aspect of the present invention is one in which one or more concave portions are formed in a conductive film. In the concave portions, components prone to electrostatic discharge failure such as electronic components are suitably accommodated. Since static electricity is hardly generated in the antistatic molded article of the present embodiment, electrostatic breakdown of the electronic components can be prevented, and adhesion of dust can also be prevented.

The size of the concave portions formed in the antistatic molded article is determined depending on the components to be accommodated.

The surface resistance value of the antistatic molded article which is measured according to JIS K6911 is preferably not more than $1 \times 10^{10} \Omega/\square$. When the surface resistance value is not more than the above upper limit, it can be said that antistatic properties are provided. The surface resistance value of the antistatic molded article is more preferably not more than $1 \times 10^{9} \Omega/\square$, and still more preferably not more than $1 \times 10^{8} \Omega/\square$.

On the other hand, the surface resistance value of the antistatic molded article is preferably equal to or greater than $1 \times 10^{2} \Omega/\square$ from the viewpoint of easy practical use.

In the antistatic molded article according to the present embodiment, the charged voltage is preferably not more than 100 V, and more preferably not more than 50 V. If the charged voltage is equal to or less than the above upper limit, sufficient antistatic properties can be ensured, and failure and contamination of the electronic components and the like to be accommodated can be prevented when the antistatic molded article is used as an electronic component storing tray.

The charged voltage can be measured using a surface potential measuring device.

The antistatic molded article in the present embodiment may be transparent or may be opaque, and is appropriately selected depending on the application.

When the antistatic molded article is transparent, the total light transmittance is preferably at least 65%, and more preferably 70% or higher. If the total light transmittance is at least 65%, in the case of using the antistatic molded article for storing electronic components, the state of the electronic components as a stored item can be inspected by visual observation or using a camera.

The total light transmittance is a value measured in accordance with JIS K 7136.

(Conductive Film)

Figure 1:
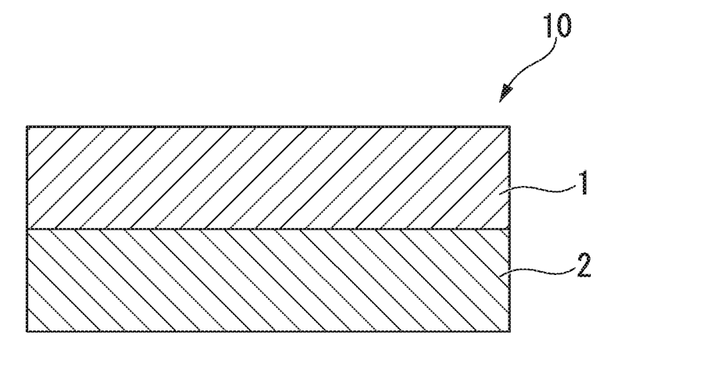
FIG. 1 is a cross-sectional view showing an example of a conductive film used in antistatic molded article of the present invention.

As shown in FIG. 1, the conductive film 10 constituting the antistatic molded article is a film provided with a film substrate 1, and a conductive layer 2 formed on at least one surface of the film substrate.

[Film Substrate]

As the film substrate, it is possible to use a plastic film.

Examples of a resin material constituting the plastic film include polyethylene, polypropylene, polystyrene, rubber-reinforced polystyrene, polyvinyl chloride, polyvinyl alcohol, polyethylene terephthalates such as amorphous polyethylene terephthalate, polybutylene terephthalate, polyethylene naphthalate, polyacrylate, polycarbonate, polyvinylidene fluoride, polyarylate, styrene-based elastomers, polyester-based elastomers, polyether sulfone, polyetherimide, polyether ether ketone, polyphenylene sulfide, polyimide, cellulose triacetate, cellulose acetate propionate, and the like. Among these resin materials, from the viewpoints of moldability, strength and cost, any of amorphous polyethylene terephthalate, polystyrene (i.e., polystyrene containing no rubber), rubber-reinforced polystyrene, and polypropylene is preferable, and amorphous polyethylene terephthalate is more preferable.

The plastic film may be selected from the group consisting of an unstretched film, a uniaxially stretched film, and a biaxially stretched film. In terms of achieving excellent mechanical properties, the plastic film is preferably a biaxially stretched film.

Moreover, the plastic film may be subjected to a surface treatment such as a corona discharge treatment, a plasma treatment and a flame treatment in order to improve adhesion of the conductive layer to be formed from a conductive polymer dispersion liquid.

The average thickness of the film substrate for coating the conductive polymer dispersion liquid is preferably at least 10 μm but not more than 2,000 μm, and more preferably at least 50 μm but not more than 1,500 μm. When the average thickness of the film substrate is equal to or more than the above lower limit, the film is less likely to break, whereas when the average thickness of the film substrate is equal to or less than the above upper limit, a sufficient level of flexibility to serve as a film can be secured.

The average thickness values in the present description are values obtained by measuring the thickness at 10 points selected arbitrarily and averaging the measured values.

[Conductive Layer]

The conductive layer includes a conductive composite containing a π-conjugated conductive polymer and a polyanion, a polyvinyl alcohol and a binder resin.

The average thickness of the conductive layer is preferably at least 10 nm but not more than 5,000 nm, more preferably at least 20 nm but not more than 1,000 nm, and still more preferably at least 30 nm but not more than 500 nm. When the average thickness of the conductive layer is equal to or more than the above lower limit, a sufficiently high level of electrical conductivity can be exhibited, whereas when the average thickness of the conductive layer is equal to or less than the above upper limit, the conductive layer can be easily formed.

The π-conjugated conductive polymer is not particularly limited as long as it is an organic polymer in which the main chain is constituted of a π-conjugated moiety and having the effects of the present invention, and examples thereof include polypyrrole-based conductive polymers, polythiophene-based conductive polymers, polyacetylene-based conductive polymers, polyphenylene-based conductive polymers, polyphenylene vinylene-based conductive polymers, polyaniline-based conductive polymers, polyacene-based conductive polymers, polythiophene vinylene-based conductive polymers, and copolymers of these polymers. From the viewpoint of stability in air, polypyrrole-based conductive polymers, polythiophene-based conductive polymers and polyaniline-based conductive polymers are preferred, and polythiophene-based conductive polymers are more preferred in view of transparency.

Examples of the polythiophene-based conductive polymers include polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), and poly(3-methyl-4-carboxybutylthiophene).

Examples of the polypyrrole-based conductive polymers include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), and poly(3-methyl-4-hexyloxypyrrole).

Examples of the polyaniline-based conductive polymers include polyaniline, poly(2-methylaniline), poly(3-isobutylaniline), poly(2-aniline sulfonic acid), and poly(3-aniline sulfonic acid).

Among the π-conjugated conductive polymers described above, poly(3,4-ethylenedioxythiophene) is particularly preferred from the viewpoints of electrical conductivity, transparency and heat resistance.

One type of the above π-conjugated conductive polymers may be used alone, or two or more types thereof may be used in combination.

[Polyanion]

The polyanion is a polymer having two or more monomer units having an anion group within the molecule. The anion group of the polyanion functions as a dopant for the π-conjugated conductive polymer, thereby improving the electrical conductivity of the π-conjugated conductive polymer.

The anion group of the polyanion is preferably a sulfo group or a carboxy group.

Specific examples of such polyanions include polymers having a sulfonic acid group such as polystyrene sulfonic acid, polyvinyl sulfonic acid, polyallyl sulfonic acid, polyacrylic sulfonic acid, polymethacrylic sulfonic acid, poly(2-acrylamide-2-methylpropane sulfonic acid), polyisoprene sulfonic acid, polysulfoethyl methacrylate, poly(4-sulfobutyl methacrylate), and polymethacrylic oxybenzene sulfonic acid; and polymers having a carboxylic acid group such as polyvinyl carboxylic acid, polystyrene carboxylic acid, polyallyl carboxylic acid, polyacrylic carboxylic acid, polymethacrylic carboxylic acid, poly(2-acrylamide-2-methylpropane carboxylic acid), polyisoprene carboxylic acid, and polyacrylic acid. Homopolymers of these and copolymers of two or more types of these may also be used.

Among these polyanions, polymers having a sulfonic acid group are preferable because the antistatic properties can be further enhanced, and polystyrene sulfonic acid is more preferable.

One type of the above polyanions may be used alone, or two or more types thereof may be used in combination.

The mass average molecular weight of the polyanion is preferably at least 20,000 but not more than 1,000,000, and more preferably at least 100,000 but not more than 500,000.

The mass average molecular weight values in the present description are values measured by gel permeation chromatography and determined using polystyrene as a reference material.

The content of the polyanion in the conductive composite is preferably in the range of 1 part by mass or more to 1,000 parts by mass or less, with respect to 100 parts by mass of the π-conjugated conductive polymer, more preferably in the range of 10 parts by mass or more to 700 parts by mass or less, and still more preferably in the range of 100 parts by mass or more to 500 parts by mass or less. If the content of the polyanion is less than the above lower limit, there is a tendency that the doping effect to the π-conjugated conductive polymer is weakened, resulting in insufficient electrical conductivity at times, and the dispersibility of the conductive composite in the conductive polymer dispersion liquid also becomes low. On the other hand, when the content of the polyanion exceeds the above upper limit, the content of the π-conjugated conductive polymer is reduced, which makes it difficult to achieve a sufficient level of electrical conductivity.

The polyanion is coordinated to and doped into the π-conjugated conductive polymer, thereby forming a conductive composite.

However, in the polyanion according to the present embodiment, not all the anion groups is doped into the π-conjugated conductive polymer, so that some anion groups that are in excess and do not contribute to the doping are present.

(Polyvinyl Alcohol)

The polyvinyl alcohol functions as a dispersant for the conductive composite and a water-dispersible resin and also has a function of improving the stretchability of the conductive layer at the time of molding to be described later.

Polyvinyl alcohols are produced by saponifying the acetyl groups of polyvinyl acetate, although a portion of acetyl groups is not saponified in some cases. Therefore, polyvinyl alcohols include a vinyl acetate unit at times. The saponification degree of the polyvinyl alcohol used in the present embodiment is preferably at least 70 mol % but not more than 100 mol %, relative to the total mole number of the acetyl groups before saponification. Here, the term "saponification degree" refers the proportion of the saponified acetyl groups to be converted to hydroxyl groups. If the saponification degree of the polyvinyl alcohol is equal to or more than the above lower limit, it can be easily dissolved in water.

The mass average molecular weight of the polyvinyl alcohol is preferably at least 1,000 but not more than 100,000, and more preferably at least 1,300 but not more than 60,000. When the mass average molecular weight of the polyvinyl alcohol is equal to or more than the above lower limit, the stretchability at normal temperatures of the conductive layer can be sufficiently improved, whereas if the mass average molecular weight of the polyvinyl alcohol is equal to or less than the above upper limit, it is possible to improve the solubility in water.

The degree of polymerization of the polyvinyl alcohol is preferably 100 to 5000, and more preferably 500 to 3000.

The content of the polyvinyl alcohol in the conductive layer is preferably at least 0.1% by mass but not more than 20% by mass, and more preferably at least 0.5% by mass but not more than 10% by mass, with respect to the total mass of the conductive layer of 100% by mass. When the content of the polyvinyl alcohol is equal to or more than the above lower limit, the stretchability of the conductive layer is enhanced even further, whereas when the content of the polyvinyl alcohol is equal to or less than the above upper limit, the decrease in the electrical conductivity can be suppressed.

(Binder Resin)

The binder resin functions as a binder of the conductive composite and facilitates the formation of the conductive layer.

Specific examples of the binder resin include acrylic resins, polyester resins, epoxy resins, oxetane resins, polyurethane resins, polyimide resins, melamine resins, silicone resins and vinyl acetate resins. One type of these binder resins may be used alone, or two or more types thereof may be used in combination.

Among the binder resins, since it becomes easy to produce the antistatic molded article, resins in which a polyester resin having an alkali metal salt of an acid group (hereinafter, referred to as an "acid group-containing polyester resin") and a glycidyl group-containing acrylic resin are crosslinked are preferred.

The acid group-containing polyester resin is a polycondensate of a dicarboxylic acid component and a diglycol component, and is a polyester resin having an alkali metal salt of an acid group (a sulfonic acid group, a carboxylic acid group, a phosphoric acid group, or the like). The acid group-containing polyester resin has a high polarity, and therefore exhibits excellent dispersibility in the conductive polymer dispersion liquid to be described later and can be stably dispersed in water without using an emulsifier or a stabilizer.

Examples of the dicarboxylic acid component include aromatic dicarboxylic acids such as phthalic acid, terephthalic acid, dimethyl terephthalate, isophthalic acid, dimethyl isophthalate, 2,5-dimethyl terephthalate, 2,6-naphthalene dicarboxylic acid, biphenyl dicarboxylic acid and orthophthalic acid; aliphatic dicarboxylic acids such as succinic acid, adipic acid, azelaic acid, sebacic acid and dodecane dicarboxylic acid; and alicyclic dicarboxylic acids such as cyclohexane dicarboxylic acid. One type of these dicarboxylic acids may be used alone, or two or more types thereof may be used in combination.

The dicarboxylic acid component preferably contains a dicarboxylic acid having a sulfonic acid alkali metal salt-type substituent in which a sulfonic acid group is neutralized by an alkali metal ($-SO_3^-X^+$, wherein X is an alkali metal ion).

The dicarboxylic acid having a sulfonic acid alkali metal salt-type substituent is a compound in which the sulfonic acid group in the dicarboxylic acid having a sulfonic acid group is an alkali metal salt.

Examples of the dicarboxylic acid having a sulfonic acid group include sulfoterephthalic acid, 5-sulfoisophthalic acid, 4-sulfoisophthalic acid, 4-sulfonaphthalene acid-2,7-dicarboxylic acid or derivatives thereof. Examples of the alkali metal include sodium, potassium, and the like.

As the dicarboxylic acid having a sulfonic acid alkali metal salt-type substituent, a sodium salt of 5-sulfoisophthalic acid and the derivatives thereof are preferred.

In the dicarboxylic acid component, the dicarboxylic acid component other than the dicarboxylic acid having a sulfonic acid alkali metal salt-type substituent is preferably an aromatic dicarboxylic acid, and more preferably terephthalic acid or isophthalic acid. The aromatic nucleus of an aromatic dicarboxylic acid exhibits high affinity with hydrophobic plastics, high adhesion to the film substrate, and excellent hydrolysis resistance.

The amount of the dicarboxylic acid having a sulfonic acid alkali metal salt-type substituent is preferably 6 mol % to 20 mol %, and is more preferably contained from 10 mol % to 18 mol %, with respect to the total mass of dicarboxylic acid components. When the content of the dicarboxylic acid having a sulfonic acid alkali metal salt-type substituent is equal to or more than the above lower limit, the dispersion time of the acid group-containing polyester resin in water can be reduced, whereas when the content of the dicarboxylic acid having a sulfonic acid alkali metal salt-type substituent is equal to or less than the above upper limit, the water resistance of the acid group-containing polyester resin becomes higher.

Examples of the diglycol component forming the acid group-containing polyester resin include diethylene glycol, and aliphatic glycols having 2 to 8 carbon atoms or alicyclic glycols having 6 to 12 carbon atoms. Specific examples of the aliphatic glycols having 2 to 8 carbon atoms or alicyclic glycols having 6 to 12 carbon atoms include ethylene glycol, 1,3-propanediol, 1,2-propylene glycol, neopentyl glycol, 1,4-butanediol, 1,4-cyclohexanedimethanol, 1,3-cyclohexanedimethanol, 1,2-cyclohexanedimethanol, 1,6-hexanediol, p-xylylene glycol and triethylene glycol. One type of these may be used alone, or two or more types thereof may be used in combination.

The diglycol component preferably includes diethylene glycol since the water resistance is further improved.

The acid group-containing polyester resin preferably has a number average molecular weight of at least 2,000 but not more than 30,000, and more preferably at least 2,500 but not more than 25,000. The number average molecular weight is a value measured by gel permeation chromatography and determined based on standard polystyrene.

If the number average molecular weight of the acid group-containing polyester resin is at least as large as the above lower limit, the water resistance of the acid group-containing polyester resin is further increased, whereas if the number average molecular weight of the acid group-containing polyester resin is equal to or less than the above upper limit, the water dispersibility of the acid group-containing polyester resin is further increased.

The method of producing an acid group-containing polyester resin is not particularly limited, and examples thereof include a method in which a dicarboxylic acid component and a diglycol component are esterified or transesterified at a temperature equal to or higher than 130° C. but equal to or lower than 200° C., and are then polycondensated at a temperature equal to or higher than 200° C. but equal to or lower than 250° C. under a reduced pressure condition. Examples of the reaction catalysts used in the production method of the acid group-containing polyester resin include metal salts of acetic acid such as zinc acetate and manganese acetate, metal oxides such as antimony oxide and germanium oxide, and titanium compounds.

The resulting acid group-containing polyester resin may be added to water to prepare a water dispersion. With respect to the water dispersion of the acid group-containing polyester resin, since it becomes difficult to obtain a uniform dispersion when the solid content concentration is increased, the polyester solid concentration is preferably not more than 30% by mass.

The glycidyl group-containing acrylic resin refers to a acylic resin having a glycidyl group.

The glycidyl group-containing acrylic resin is either a homopolymer of a glycidyl group-containing, radically polymerizable unsaturated monomer, or a copolymer of a glycidyl group-containing, radically polymerizable unsaturated monomer and another radically polymerizable unsaturated monomer copolymerizable with the aforementioned monomer.

Examples of the glycidyl group-containing, radically polymerizable unsaturated monomers include glycidyl acrylate, glycidyl methacrylate, and glycidyl ethers such as allyl glycidyl ether. One type of these glycidyl group-containing, radically polymerizable unsaturated monomers may be used alone, or two or more types thereof may be used in combination.

The content of the glycidyl group-containing, radically polymerizable unsaturated monomer is preferably at least 10% by mass but not more than 100% by mass, with respect to the total mass of all the monomers, and more preferably at least 20% by mass but not more than 100% by mass.

It is thought that the glycidyl group-containing acrylic resin promotes self-crosslinking and improves the water resistance by having glycidyl group-containing, radically polymerizable unsaturated monomer units.

Examples of the other radically polymerizable unsaturated monomer copolymerizable with the glycidyl group-containing, radically polymerizable unsaturated monomer include vinyl esters, unsaturated carboxylic acid esters, unsaturated carboxylic acid amides, unsaturated nitriles, unsaturated carboxylic acids, allyl compounds, nitrogen-containing vinyl monomers, hydrocarbon vinyl monomers or vinyl silane compounds. One type of these other radically polymerizable unsaturated monomers may be used alone, or two or more types thereof may be used in combination.

As the other radically polymerizable unsaturated monomer, it is preferable to use an unsaturated carboxylic acid monomer such as acrylic acid and methacrylic acid, since the effect of improving the water resistance is further enhanced by the crosslinking with glycidyl groups.

The content of the unsaturated carboxylic acid monomer is preferably at least 5% by mass but not more than 20% by mass, with respect to the total mass of all the monomers. When the content of the unsaturated carboxylic acid monomer is equal to or more than the above lower limit, the effect of concomitantly using the unsaturated carboxylic acid monomer is sufficiently achieved, whereas when the content is not more than the above upper limit, it is possible to suppress gelation of the liquid and deterioration of storage stability over time.

The method for producing a glycidyl group-containing acrylic resin is not particularly limited, and a glycidyl group-containing acrylic resin can be produced, for example, by emulsion polymerization of the monomers which constitutes the glycidyl group-containing acrylic resin.

In the production of glycidyl group-containing acrylic resin by emulsion polymerization, for example, ion-exchanged water, a polymerization initiator and a surfactant are charged into a reaction tank, then ion-exchanged water and a surfactant are charged into a dropping tank, followed by charging of a monomer to prepare an emulsified product, and then the emulsified product is added dropwise to the reaction tank to perform emulsion radical polymerization. The reaction temperature is preferably at least 60° C. but not more than 100° C., and the reaction time is preferably at least 4 hours but not more than 10 hours.

As the surfactant used in the emulsion polymerization, one or more of anionic surfactants, nonionic reactive surfactants and nonreactive surfactants may be used.

Examples of the polymerization initiators used in the emulsion polymerization include general radical polymerization initiators, such as water-soluble peroxides such as potassium persulfate, ammonium persulfate, and hydrogen peroxide, or oil-soluble peroxides such as benzoyl peroxide and t-butyl hydroperoxide, or azo compounds such as azobisisobutyronitrile.

The content of the binder resin, relative to 100 parts by mass of the solid content of the conductive composite is preferably at least 100 parts by mass but not more than 10,000 parts by mass, more preferably at least 100 parts by mass but not more than 5,000 parts by mass, and still more preferably at least 100 parts by mass but not more than 1,000 parts by mass. When the content of the binder resin is equal to or more than the above lower limit, it is possible to improve the film formability and film strength. However, when the content of the binder resin exceeds the above upper limit, since the content of the conductive composite is reduced, the electrical conductivity may be lowered.

The conductive layer may contain a conductivity enhancing agent in order to further improve the electrical conductivity.

More specifically, the conductivity enhancing agent is at least one compound selected from the group consisting of nitrogen-containing aromatic cyclic compounds, compounds having two or more hydroxy groups, compounds having two or more carboxy groups, compounds having one or more hydroxy groups and one or more carboxy group, compounds having an amide group, compounds having an imide group, lactam compounds, and compounds having a glycidyl group.

Specific examples of these compounds are described, for example, in Japanese Unexamined Patent Application, First Publication No. 2010-87401. However, the conductivity enhancing agent is a compound other than the aforementioned π-conjugated conductive polymers, the aforementioned polyanions, the aforementioned polyvinyl alcohols and the aforementioned binder resins.

Among the conductivity enhancing agents, glycols that are linear compounds having two hydroxy groups are preferred, and propylene glycol is more preferred, because they are highly effective for improving the electrical conductivity, and are capable of suppressing deterioration of the stretchability of the conductive layer during molding.

The content of the conductivity enhancing agent is preferably at least 1 time but not more than 1,000 times the total mass of the conductive composite, and more preferably at least 2 times but not more than 100 times the total mass of the conductive composite. When the content of the conductivity enhancing agent is equal to or more than the above lower limit, the effect of improving the electrical conductivity by the addition of the conductivity enhancing agent is sufficiently achieved, whereas when the content is not more than the above upper limit, a decrease in the electrical conductivity due to reduction in the concentration of the π-conjugated conductive polymer can be prevented.

(Additive)

The conductive polymer dispersion liquid may contain a known additive.

The additive is not particularly limited as long as it has the effect of the present invention, and, for example, surfactants, inorganic conductive agents, antifoaming agents, coupling agents, antioxidants, ultraviolet absorbers, and the like can be used. However, the additive is composed of a compound other than the aforementioned polyanions, the aforementioned polyvinyl alcohols, the aforementioned binder resins and the aforementioned conductivity enhancing agents.

Examples of the surfactants include nonionic surfactants, anionic surfactants, and cationic surfactants, although nonionic surfactants are preferred from the viewpoint of storage stability. In addition, a polymer-based surfactant such as polyvinylpyrrolidone may be added.

Examples of the inorganic conductive agents include metal ions, conductive carbon, and the like.

It should be noted that the metal ions can be produced by dissolving metal salts in water.

Examples of the antifoaming agents include silicone resins, polydimethylsiloxane, silicone oil, and the like.

Examples of the coupling agents include a silane coupling agent or the like having a vinyl group, an amino group, an epoxy group, and the like.

Examples of the antioxidants include phenol-based antioxidants, amine-based antioxidants, phosphorus-based antioxidants, sulfur-based antioxidants, sugars, vitamins, and the like.

Examples of the ultraviolet absorbers include benzotriazole-based ultraviolet absorbers, benzophenone-based ultraviolet absorbers, salicylate-based ultraviolet absorbers, cyanoacrylate-based ultraviolet absorbers, oxanilide-based ultraviolet absorbers, hindered amine-based ultraviolet absorbers, benzoate-based ultraviolet absorbers, and the like.

<Method for Producing Antistatic Molded Article>

The method for producing an antistatic molded article according to one aspect of the present invention includes a conductive film producing step and a molding step.

(Conductive Film Producing Step)

A conductive film producing step in the present embodiment is a step for coating, a conductive polymer dispersion liquid onto at least one surface of a film substrate and dried, to obtain a conductive film.

The average thickness of the film substrate for coating the conductive polymer dispersion liquid, that is, prior to molding, is preferably at least 10 μm but not more than 2,000 μm, and more preferably at least 50 μm but not more than 1,500 μm. When the average thickness of the film substrate is equal to or more than the above lower limit, the film is less likely to break, whereas when the average thickness of the film substrate is equal to or less than the above upper limit, a sufficient level of flexibility to serve as a film can be secured.

[Conductive Polymer Dispersion Liquid]

The conductive polymer dispersion liquid contains a conductive composite, a polyvinyl alcohol, a binder component, and a dispersion medium for dispersing the aforementioned conductive composite, and can be obtained by adding the polyvinyl alcohol and the binder component in an aqueous conductive polymer dispersion. After adding the polyvinyl alcohol and the binder component to the aqueous conductive polymer dispersion, it is preferable to stir the resulting mixture to uniformly disperse the respective components. In addition, the above-mentioned additive may be added to the conductive polymer dispersion liquid.

Here, an aqueous conductive polymer dispersion is a dispersion liquid in which the conductive composite containing the π-conjugated conductive polymer and the polyanion is contained in an aqueous dispersion medium, and can be obtained by polymerizing a precursor monomer of the π-conjugated conductive polymer in an aqueous polyanion solution through chemical oxidative polymerization.

The binder component to be added to the aqueous conductive polymer dispersion may be a resin, or may be a thermosetting compound or an active energy ray-curable compound. Further, the binder component preferably exhibits high water dispersibility.

In the present embodiment, as the binder component, those containing an acid group-containing polyester resin and a glycidyl group-containing acrylic resin are preferred, since they exhibit high water dispersibility and it becomes easy to produce the antistatic molded article.

The binder component containing an acid group-containing polyester resin and a glycidyl group-containing acrylic resin exhibits self-crosslinking properties.

When the binder component contains an acid group-containing polyester resin and a glycidyl group-containing acrylic resin, if the total of the solid content of the acid group-containing polyester resin and the glycidyl group-containing acrylic resin is 100% by mass, the ratio of the acid group-containing polyester resin is preferably equal to or more than 10% by mass, and more preferably equal to or more than 20% by mass. If the ratio of the acid group-containing polyester resin is equal to or more than 10% by mass, that is, if the glycidyl group-containing acrylic resin is equal to or less than 90% by mass, adhesion to the film substrate and transparency of the conductive layer increases, whereas if the acid group-containing polyester resin is equal to or less than 80% by mass, that is, if the glycidyl group-containing acrylic resin is equal to or more than 20% by mass, water resistance of the conductive layer becomes even higher.

Examples of the dispersion medium in the present embodiment include water or a mixture of water and a water-soluble organic solvent (hereinafter, referred to as "aqueous dispersion medium"). The content of water in the aqueous dispersion medium is preferably at least 50% by mass, and more preferably 80% by mass or higher. On the other hand, the content of water in the aqueous dispersion medium is preferably not more than 95% by mass. That is, the content of water in the aqueous dispersion medium is preferably at least 50% by mass but not more than 95% by mass, and more preferably at least 80% by mass but not more than 95% by mass.

Examples of the water-soluble organic solvent include solvents with a solubility parameter of 10 or more, such as a monohydric alcohol solvent, a nitrogen atom-containing polar solvent, a phenol solvent, a polyhydric aliphatic alcohol solvent, a carbonate solvent, an ether solvent, a heterocyclic compound, and a nitrile compound.

Examples of the monohydric alcohol solvent include methanol, ethanol, isopropanol and the like.

Examples of the nitrogen atom-containing polar solvents include N-methyl-2-pyrrolidone, N-methylacetamide, N,N-dimethylformamide, N,N-dimethylacetamide, dimethyl sulfoxide, hexamethylene phosphortriamide, N-vinylpyrrolidone, N-vinylformamide, N-vinylacetamide, and the like. The nitrile compounds are not included in the nitrogen atom-containing polar solvents.

Examples of the phenol solvent include cresol, phenol, xylenol, and the like.

Examples of the polyhydric aliphatic alcohol solvent include ethylene glycol, propylene glycol, dipropylene glycol, 1,3-butylene glycol, isoprene glycol, 1,4-butanediol, 1,5-pentanediol, 1,6-hexanediol, 1,9-nonanediol, neopentyl glycol and the like.

Examples of the carbonate solvent include ethylene carbonate and propylene carbonate.

Examples of the ether solvent include dioxane, diethyl ether, propylene glycol dialkyl ethers, polyethylene glycol dialkyl ethers, polypropylene glycol dialkyl ethers, and the like.

Examples of the heterocyclic compounds include 3-methyl-2-oxazolidinone, and the like.

Examples of the nitrile compound include acetonitrile, glutaronitrile, methoxyacetonitrile, propionitrile, benzonitrile, and the like.

These solvents may be used alone, or may be used as a mixture of two or more types. Of these, from the viewpoint of stability, at least one selected from the group consisting of methanol, ethanol, isopropanol, and dimethyl sulfoxide is preferred.

The content of the dispersion medium in the conductive polymer dispersion liquid, based on the total mass of 100% by mass of the conductive polymer dispersion liquid, is preferably at least 50% by mass but not more than 90% by mass, and more preferably at least 70% by mass but not more than 90% by mass. When the content of the dispersion medium is equal to or more than the above lower limit, it is possible to easily disperse the respective components and improve the coating property, whereas if the content is equal to or less than the above upper limit, since the solid concentration becomes higher, it is possible to easily secure the required thickness by a single coating process.

The content of polyvinyl alcohol in the conductive polymer dispersion liquid, based on the total mass of 100% by mass of the conductive polymer dispersion liquid, is preferably at least 0.01% by mass but not more than 10% by mass, and more preferably 0.1% by mass or more but not more than 5% by mass. When the content of the polyvinyl alcohol is equal to or more than the above lower limit, the moldability of the resulting conductive film can be enhanced even further, whereas when the content of the polyvinyl alcohol is equal to or less than the above upper limit, the decrease in electrical conductivity can be suppressed.

The content of the binder component, relative to 100 parts by mass of the solid content of the conductive composite is preferably at least 100 parts by mass but not more than 10,000 parts by mass, more preferably at least 100 parts by mass but not more than 5,000 parts by mass, and still more preferably at least 100 parts by mass but not more than 1,000 parts by mass. When the content of the binder component is equal to or more than the above lower limit, it is possible to improve the film formability and film strength. However, when the content of the binder component exceeds the above upper limit value, since the content of the conductive composite is reduced, the electrical conductivity may be lowered.

When adding the above-mentioned additive in the conductive polymer dispersion liquid, the added amount of the additive in the conductive polymer dispersion liquid is appropriately determined depending on the type of additive, although it is usually in the range of at least 0.001 parts by mass to 5 parts by mass or less, relative to 100 parts by mass of the solid content of conductive composite.

As a method of coating a conductive polymer dispersion liquid, for example, a coating method using a coater such as a gravure coater, a roll coater, a curtain flow coater, a spin coater, a bar coater, a reverse coater, a kiss coater, a fountain coater, a rod coater, an air doctor coater, a knife coater, a blade coater, a cast coater and a screen coater, a spray method using an atomizer such as an air spray, an airless spray and rotor dampening, a dipping method such as a dipping process, or the like can be employed.

Among the various possibilities described above, a bar coater is used in some cases because a coating process can be conducted easily and conveniently. The coating thickness is different depending on the type of the bar coater. Commercially available bar coaters are numbered for each type, and as the number increases, the coating thickness increases.

The amount of the mixture being coated onto the film substrate is not particularly limited, although it is preferably within the range of 0.1 $g/m^2$ or more to 2.0 $g/m^2$ or less in terms of solid content.

In addition, at the time of coating, the conductive layer may be formed by coating the conductive polymer dispersion liquid only on one surface of the film substrate, or the conductive layer may be formed by coating the conductive polymer dispersion liquid on both surfaces of the film substrate. In the case of coating the conductive polymer dispersion liquid on both surfaces of the film substrate, both sides may be coated with a so-called one-pass process. More specifically, the conductive polymer dispersion liquid may be coated on both surfaces of the film substrate at the same time, or it is possible to coat the conductive polymer dispersion liquid on one surface of the film substrate, and then, without winding up, the conductive polymer dispersion liquid may be coated on the other surface of the film substrate. In the double-sided coating through a one-pass process, the productivity is high despite coating the conductive polymer dispersion liquid on both surfaces of the film substrate.

The coating process may be a so-called in-line coating process. In other words, the conductive polymer dispersion liquid may be continuously coated to a film substrate while continuously producing the film substrate by extrusion molding. More specifically, while continuously producing a film substrate by subjecting a resin for forming the film substrate to extrusion molding using an extrusion molding machine equipped with a T-die, the conductive polymer dispersion liquid may be continuously coated onto the produced film substrate, without winding up the film substrate, using a coating apparatus provided on the downstream side of the extrusion molding machine.

As a method of drying the coated conductive polymer dispersion liquid, drying by heating, vacuum drying, and the like can be employed. As the drying by heating, for example, conventional methods such as hot air heating or infrared heating can be adopted.

The drying temperature in the drying step is preferably not more than 110° C., more preferably at least 40° C. but not more than 90° C., and still more preferably equal to or more than 50° C. and equal to or less than 80° C. If the drying temperature is 110° C. or less, it is possible to maintain the film shape by preventing the softening of the film substrate. In addition, in those cases where the binder component contains an acid group-containing polyester resin and a glycidyl group-containing acrylic resin, cross-linking can be suppressed if the drying temperature is equal to or less than 110° C.

Further, when the film substrate is formed of an amorphous polyester, if the drying temperature is equal to or less than 110° C., it is possible to suppress the white turbidity due to crystallization of the polyester, and a decrease in the transparency of the molded article can be prevented. On the other hand, if the drying temperature is equal to or higher than 40° C., drying can be sufficiently conducted even if the film feed speed is fast.

The drying time is preferably 10 seconds to 5 minutes, and more preferably 30 seconds to 2 minutes.

Further, it is preferable to perform a curing process after drying. When the curing process is not carried out, the conductive layer immediately after drying may not exhibit the water resistance sufficiently.

In terms of the conditions for the curing process, it is preferable to leave the conductive film after drying to stand indoors for at least 20 hours at a temperature equal to or higher than 20° C. but not more than 50° C. By curing under this condition, the water resistance of the conductive layer can be enhanced even further.

(Molding Step)

The molding step is a step of subjecting the conductive film to molding so as to form a concave portion or a convex portion.

Specifically, as a molding method, a vacuum molding method, a pressure molding method, and a press molding method can be mentioned. In terms of providing a high-precision molded article, the vacuum molding method is preferred.

In the vacuum molding method, it is possible to form a concave portion or a convex portion by bringing the conductive film into close contact with a convex mold or a concave mold, that is, to perform a so-called drawing molding. In the case of forming the antistatic molded article into a tray to be used for storing electronic components, a concave portion to serve as a housing part of the electronic components is formed by molding.

The vacuum molding conditions are adjusted in accordance with the conditions for easily forming the desired concave portion. Examples of the vacuum molding conditions include the molding temperature, the degree of vacuum, and the like.

The molding temperature is preferably higher than 110° C., and more preferably at least 120° C. but not more than 180° C. Here, the molding temperature is a surface temperature of the conductive film at the time of molding. If the molding temperature is higher than 110° C., the conductive film can be easily molded. On the other hand, if the molding temperature is equal to or less than the above upper limit, it is possible to prevent thermal deterioration of the conductive film during molding.

The degree of vacuum is preferably lower than the atmospheric pressure, and more preferably 100 kPa to $10^{-5}$ Pa.

The draw ratio at the time of vacuum molding is not particularly limited, and is appropriately selected according to the shape of the intended molded article, for example, within a range of 1 time or more to 10 times or less.

The draw ratio can be calculated from "the thickness of the film before stretching/the thickness of the film after stretching".

The molding temperature in the pressure molding method is preferably 110° C. or more, and more preferably 120 to 180° C.

The pressure in the pressure molding method is preferably higher than the atmospheric pressure, and more preferably 0.11 to 1.0 MPa.

The molding temperature in the press molding method is preferably 110° C. or more, and more preferably 120 to 180° C.

(Operation and Effect)

In the method for producing an antistatic molded article of the present embodiment, the conductive layer in the conductive film used in the molding contains a polyvinyl alcohol, in addition to the conductive composite containing a π-conjugated conductive polymer and a polyanion. Because the polyvinyl alcohol has an effect of improving the stretchability, the conductive layer can be stretched sufficiently when subjecting the conductive film to molding, despite containing the π-conjugated conductive polymer in the conductive layer. For this reason, the film thickness of the conductive layer becomes uniform after stretching, deterioration of the electrical conductivity can be prevented, and the antistatic properties of the molded body can be enhanced.

Therefore, according to the method for producing an antistatic molded article of the present embodiment, a molded body having excellent antistatic properties can be easily produced in spite of using the π-conjugated conductive polymer.

In addition, in the method for producing an antistatic molded article of the present embodiment, when using an acid group-containing polyester resin and a glycidyl group-containing acrylic resin as the binder components, these are difficult to cross-link at a usual drying temperature of the conductive polymer dispersion liquid (equal to or less than 110° C.). Because a cross-linked resin exhibits low stretchability, the moldability reduces. However, since the acid group-containing polyester resin and the glycidyl group-containing acrylic resin are not crosslinked after drying, the conductive layer containing these exhibits a high level of moldability.

Further, heating is typically conducted to a temperature of higher than 110° C., the acid group-containing polyester resin and the glycidyl group-containing acrylic resin that did not crosslink upon drying can be crosslinked and cured in the molding process. Therefore, it is possible to easily form a conductive layer having excellent film strength and water resistance.

EXAMPLES

Production Example 1

206 g of sodium styrenesulfonate was dissolved in 1,000 mL of ion-exchanged water, and while stirring at 80° C., 1.14 g of an oxidizing agent solution of ammonium persulfate dissolved in advance in 10 mL of water was added dropwise thereto for 20 minutes, and the resulting mixture solution was stirred for 12 hours.

1,000 mL of sulfuric acid diluted to 10% by mass was added to the resulting sodium styrenesulfonate-containing solution, and about 1,000 mL of a polystyrene sulfonate-containing solution was removed by ultrafiltration. Then, 2,000 mL of ion-exchanged water was added to the residual liquid, and about 2,000 mL of the solution was removed by ultrafiltration. The ultrafiltration operation described above was repeated three times. Further, about 2,000 mL of ion-exchanged water was added to the resulting filtrated liquid, and about 2,000 mL of the solution was removed by ultrafiltration.

The ultrafiltration operation was repeated three times.

The water in the resulting solution was removed under reduced pressure to obtain polystyrene sulfonate in the form of a colorless solid.

Production Example 2

14.2 g of 3,4-ethylenedioxythiophene and a solution obtained by dissolving 36.7 g of polystyrene sulfonate in 2,000 mL of ion exchanged water were mixed at 20° C.

The mixed solution obtained as a result was kept at 20° C. and stirred while 29.64 g of ammonium persulfate dissolved in 200 mL of ion-exchanged water and 8.0 g of an oxidation catalyst solution of ferric sulfate were slowly added thereto, and the resulting mixture was stirred for 3 hours for reaction.

Then, 2,000 mL of ion-exchanged water was added to the resulting reaction solution, and about 2,000 mL of the solution was removed by ultrafiltration. This operation was repeated three times.

Then, 200 mL of sulfuric acid diluted to 10% by mass and 2,000 mL of ion-exchanged water were added to the resulting solution, and about 2,000 mL of the solution was removed by ultrafiltration. Then, 2,000 mL of ion-exchanged water was added thereto, and about 2,000 mL of the solution was removed by ultrafiltration. This operation was repeated three times.

Furthermore, 2,000 mL of ion-exchanged water was added to the resulting solution, and about 2,000 mL of the solution was removed by ultrafiltration. This operation was repeated 5 times to obtain 1.2% by mass of an aqueous polystyrene sulfonate-doped poly(3,4-ethylenedioxythiophene) dispersion (aqueous PEDOT-PSS dispersion).

Example 1

44.5 g of water, 5 g of propylene glycol, 0.5 g of polyvinyl alcohol (PVA210, manufactured by Kuraray Co., Ltd., polymerization degree: 1,000) and 15 g of a binder component (mixture of a water-dispersible polyester resin having an alkali metal salt of an acid group and a glycidyl group-containing acrylic resin; PESRESIN 645GH, manufactured by Takamatsu Oil & Fat Co., Ltd., glass transition temperature: 55° C., solid content concentration: 30% by mass) were mixed with 35 g of the aqueous PEDOT-PSS dispersion to obtain a conductive polymer dispersion liquid. With respect to 100% by mass of the conductive polymer dispersion liquid, the solid content concentration of PEDOT-PSS was 0.42% by mass and the solid content concentration of the polyvinyl alcohol was 0.50% by mass.

The conductive polymer dispersion liquid was coated on one side of a rubber-reinforced polystyrene (hereinafter referred to as "HIPS") film with a No. 6 bar coater, and then dried for 30 seconds at 70° C. to form a conductive layer, thereby obtaining a conductive film.

Then, the conductive film was subjected to vacuum molding using a vacuum molding machine equipped with an upper mold and a lower mold having a concave portion. More specifically, in a state where the upper mold and the lower mold were opened, the conductive film was placed between the upper mold and the lower mold and heated by a heater of the upper mold while measuring the film surface temperature.

After the film surface temperature reached 150° C., the lower mold was elevated toward the upper mold and pressed against the conductive film. An evacuation process was carried out from the lower mold side while being in that state, and the molds were held for 20 seconds. Thereafter, the temperature was cooled to 40° C., and the lower mold was lowered to take out a molded article.

It should be noted that the molded article had a circular shape in which the diameter of the opening was 100 mm, and was provided with a cylindrical concave portion with a depth of 30 mm. Further, the molding magnification at the time of vacuum molding was set to 3 times.

Example 2

A molded article was obtained in the same manner as in Example 1 with the exception that the amount of water was changed to 44.75 g and the amount of PVA210 was changed to 0.25 g (0.25% by mass in terms of the solid content concentration of polyvinyl alcohol) in Example 1.

Example 3

A molded article was obtained in the same manner as in Example 1 with the exception that the amount of water was changed to 44.25 g and the amount of PVA210 was changed to 0.75 g (0.75% by mass in terms of the solid content concentration of polyvinyl alcohol) in Example 1.

Example 4

A molded article was obtained in the same manner as in Example 1 with the exception that PVA210 in Example 1 was changed to PVA217 (polyvinyl alcohol, manufactured by Kuraray Co., Ltd., degree of polymerization: 1,700).

Example 5

A molded article was obtained in the same manner as in Example 1 with the exception that PVA210 in Example 1 was changed to PVA224 (polyvinyl alcohol, manufactured by Kuraray Co., Ltd., degree of polymerization: 2,400).

Example 6

A molded article was obtained in the same manner as in Example 1 with the exception that PESRESIN 645GH in Example 1 was changed to PLAS COAT RZ-105 (water-dispersible polyester, manufactured by GOO Chemical Co., Ltd., glass transition temperature: 52° C., solid content concentration: 25% by mass).

Example 7

A molded article was obtained in the same manner as in Example 1 with the exception that the amount of the aqueous PEDOT-PSS dispersion was changed to 70 g (0.84% by mass in terms of the solid content concentration of PEDOT-PSS) and the amount of water was changed to 14.5 g in Example 1.

Example 8

A molded article was obtained in the same manner as in Example 1 with the exception that the film substrate in Example 1 was changed to an amorphous polyethylene terephthalate (hereinafter referred to as "A-PET") film.

Example 9

A molded article was obtained in the same manner as in Example 1 with the exception that the film substrate in Example 1 was changed to a polystyrene (hereinafter referred to as "GPPS") film containing no rubber.

Example 10

A molded article was obtained in the same manner as in Example 1 with the exception that the film substrate in Example 1 was changed to a polypropylene (PP) film.

Example 11

A molded article was obtained in the same manner as in Example 1 with the exception that the propylene glycol (PPG) in Example 1 was not added.

Comparative Example 1

A molded article was obtained in the same manner as in Example 1 with the exception that PVA210 in Example 1 was not added.

Comparative Example 2

A molded article was obtained in the same manner as in Example 11 with the exception that PVA210 in Example 11 was not added.

<Evaluation>

The surface resistance values of the conductive film and molded article in each example were measured using a resistivity meter (Loresta or Hiresta manufactured by Mitsubishi Chemical Corporation). The measurement results are shown in Table 1.

TABLE 1

| | Film substrate material | PEDOT-PSS solid content concentration (% by mass) | Polyvinyl alcohol Type | Polyvinyl alcohol Solid content concentration (% by mass) | Binder resin | PPG | Surfaces resistance value ($\Omega/\square$) Conductive film | Surfaces resistance value ($\Omega/\square$) Molded article |
|---|---|---|---|---|---|---|---|---|
| Ex. 1 | HIPS | 0.42 | PVA210 | 0.50 | PESRESIN A-645GH | Present | $1.0 \times 10^3$ | $3.0 \times 10^6$ |
| Ex. 2 | HIPS | 0.42 | PVA210 | 0.25 | PESRESIN A-645GH | Present | $8.0 \times 10^3$ | $8.0 \times 10^6$ |
| Ex. 3 | HIPS | 0.42 | PVA210 | 0.75 | PESRESIN A-645GH | Present | $6.0 \times 10^6$ | $8.0 \times 10^6$ |
| Ex. 4 | HIPS | 0.42 | PVA217 | 0.50 | PESRESIN A-645GH | Present | $9.0 \times 10^3$ | $4.0 \times 10^6$ |
| Ex. 5 | HIPS | 0.42 | PVA224 | 0.50 | PESRESIN A-645GH | Present | $1.0 \times 10^4$ | $9.0 \times 10^6$ |
| Ex. 6 | HIPS | 0.42 | PVA210 | 0.50 | PLAS COAT RZ-105 | Present | $1.0 \times 10^3$ | $6.0 \times 10^6$ |
| Ex. 7 | HIPS | 0.84 | PVA210 | 0.50 | PESRESIN A-645GH | Present | $4.0 \times 10^3$ | $5.0 \times 10^5$ |
| Ex. 8 | A-PET | 0.42 | PVA210 | 0.50 | PESRESIN A-645GH | Present | $1.0 \times 10^3$ | $4.0 \times 10^6$ |
| Ex. 9 | GPPS | 0.42 | PVA210 | 0.50 | PESRESIN A-645GH | Present | $1.0 \times 10^3$ | $5.0 \times 10^6$ |
| Ex. 10 | PP | 0.42 | PVA210 | 0.50 | PESRESIN A-645GH | Present | $1.0 \times 10^3$ | $8.0 \times 10^6$ |
| Ex. 11 | HIPS | 0.42 | PVA210 | 0.50 | PESRESIN A-645GH | Absent | $1.0 \times 10^7$ | $6.0 \times 10^8$ |
| Comp. Ex. 1 | HIPS | 0.42 | — | — | PESRESIN A-645GH | Present | $3.0 \times 10^3$ | OVER |
| Comp. Ex. 2 | HIPS | 0.42 | — | — | PESRESIN A-645GH | Present | $2.0 \times 10^6$ | OVER |

The molded articles of each of the Examples that were produced using a conductive polymer dispersion liquid containing a polyvinyl alcohol in addition to the conductive composite had a small surface resistance value and exhibited excellent antistatic properties.

The molded articles of each of the Comparative Examples that were produced using a conductive polymer dispersion liquid containing the conductive composite but did not contain a polyvinyl alcohol had a large surface resistance value and exhibited low antistatic properties. In each of the Comparative Examples, although the surface resistance value was small in the state of a conductive film, the surface resistance value was increased after molding. This is presumably because when a polyvinyl alcohol was not included, stretchability of the conductive layer containing the conductive composite was low, and a uniform layer was not formed.

What is claimed is:

1. A method for producing an antistatic molded article, the method comprising:
   a conductive film preparation step to obtain a conductive film comprising coating and drying a conductive polymer dispersion liquid containing a conductive composite that contains a π-conjugated conductive polymer and a polyanion, a polyvinyl alcohol, a binder component being free of a silicone resin, and a dispersion medium for dispersing the conductive composite on at least one surface of a film substrate, the conductive polymer dispersion liquid being free of additives comprising a silicone resin and free of additives comprising a silane coupling agent having an epoxy group, the conductive polymer dispersion liquid containing 100 parts by mass to 10,000 parts by mass of the binder resin, relative to 100 parts by mass of a solid content of the conductive composite; and
   a molding step for subjecting the conductive film to vacuum molding to form the antistatic molded article.

2. The method for producing an antistatic molded article according to claim 1,
   wherein the binder component comprises a polyester resin having an alkali metal salt of an acid group and a glycidyl group-containing acrylic resin.

3. The method for producing an antistatic molded article according to claim 2,
   wherein the polyester resin is a polycondensate of a dicarboxylic acid component and a diglycol component;
   the dicarboxylic acid component comprises a dicarboxylic acid having a sulfonic acid alkali metal salt-type substituent, and
   the diglycol component comprises diethylene glycol.

4. The method for producing an antistatic molded article according to claim 1,
   wherein the film substrate is continuously produced by extrusion molding while continuously coating the conductive polymer dispersion liquid to the film substrate, during coating in the conductive film preparation step.

5. The method for producing an antistatic molded article according to claim 1,
   wherein the conductive polymer dispersion liquid is simultaneously coated on both surfaces of the film substrate, during coating in the conductive film preparation step.

6. The method for producing an antistatic molded article according to claim 1,
   wherein after coating the conductive polymer dispersion liquid on one surface of the film substrate, the conductive film preparation step comprises coating the conductive polymer dispersion liquid on the other surface of the film substrate without winding up.

7. The method for producing an antistatic molded article according to claim 1,
   wherein the film substrate is constituted of any one of an amorphous polyethylene terephthalate film, a polystyrene film, a rubber-reinforced polystyrene film, and a polypropylene film.

8. The method for producing an antistatic molded article according to claim 1,
   wherein the dispersion medium contains water, and a content of water in the dispersion medium is 80% by mass or more, relative to the total mass of the dispersion medium.

9. The method for producing an antistatic molded article according to claim 1,
   wherein the π-conjugated conductive polymer is poly(3,4-ethylenedioxythiophene).

10. The method for producing an antistatic molded article according to claim 1,
    wherein the polyanion is a polystyrene sulfonic acid.

11. The method for producing an antistatic molded article according to claim 1,
    wherein the conductive polymer dispersion liquid further comprises a conductivity enhancing agent.

12. The method for producing an antistatic molded article according to claim 11,
    wherein the conductivity enhancing agent is propylene glycol.

13. The method for producing an antistatic molded article according to claim 1, wherein the polyvinyl alcohol has a degree of polymerization of between 1000 and 2400.

14. The method for producing an antistatic molded article according to claim 1, wherein the polyvinyl alcohol has a degree of polymerization of between 1000 and 1700.

15. The method for producing an antistatic molded article according to claim 1, wherein the molding step comprises vacuum molding under a degree of vacuum of between 100 kPa and $10^{-5}$ Pa.

16. The method for producing an antistatic molded article according to claim 1, wherein the molding step comprises bringing the conductive film into close contact with a convex mold or a concave mold to form the antistatic molded article having a convex portion or a concave portion.

17. The method for producing an antistatic molded article according to claim 1, wherein the binder component is selected from an acrylic resin, a polyester resin, an epoxy resin, an oxetane resin, a polyurethane resin, a polyimide resin, a melamine resin, a vinyl acetate resin, and combinations thereof.

* * * * *